Nov. 5, 1963    F. R. BERGSTEN ETAL    3,109,813
SEPTIC TANKS
Filed June 15, 1960

INVENTOR.
FRANK R. BERGSTEN
ARVID H. BERGSTEN
BY George F. Williamson &
H. Dale Palmatier
ATTORNEYS United States Patent Office 3,109,813
Patented Nov. 5, 1963

3,109,813
SEPTIC TANKS
Frank R. Bergsten, 427 Western, and Arvid H. Bergsten, 2221 N. Fenny, both of Anoka, Minn.
Filed June 15, 1960, Ser. No. 36,414
1 Claim. (Cl. 210—532)

This invention relates to septic tank constructions.

One of the long existing problems associated with sewerage disposal systems especially in rural and occasionally in suburban areas in which septic tanks are employed is a frequent need of having the septic tanks cleaned to rid the tanks of an accumulation of scum and sludge therein. This accumulation of scum and sludge material within the conventional septic tank results from the inability of the anaerobic bacteria to completely break down the solid sewage material.

Failure to have septic tanks cleaned, usually by a pumping operation, results in raw sewerage being disseminated into the drain field which ultimately results in the drain field becoming clogged with this material. When a drain field becomes clogged with such raw sewerage material, not only will the drain field fail to function but the underlying ground water will become polluted and contaminated rendering it unfit for human consumption and use.

Our invention is directed towards providing a septic tank construction which overcomes these problems.

An object of this invention is to provide a novel septic tank, of simple and inexpensive construction, and which is arranged and constructed to function in a more efficient manner than any heretofore known comparable devices.

Another object of this invention is to provide a novel and improved septic tank, arranged and constructed so that the heated sewerage gas generated during the septic action is trapped within the tank to thereby enhance the activity of the sewerage-destroying anaerobic bacteria.

A further object of this invention is to provide a novel and improved departmented septic tank having a plurality of self-heated chambers arranged and constructed so that sewerage material is sequentially treated in each of said chambers thus causing all of the raw sewage material to be completely decomposed prior to discharge of the water from the tank.

Figure 1:
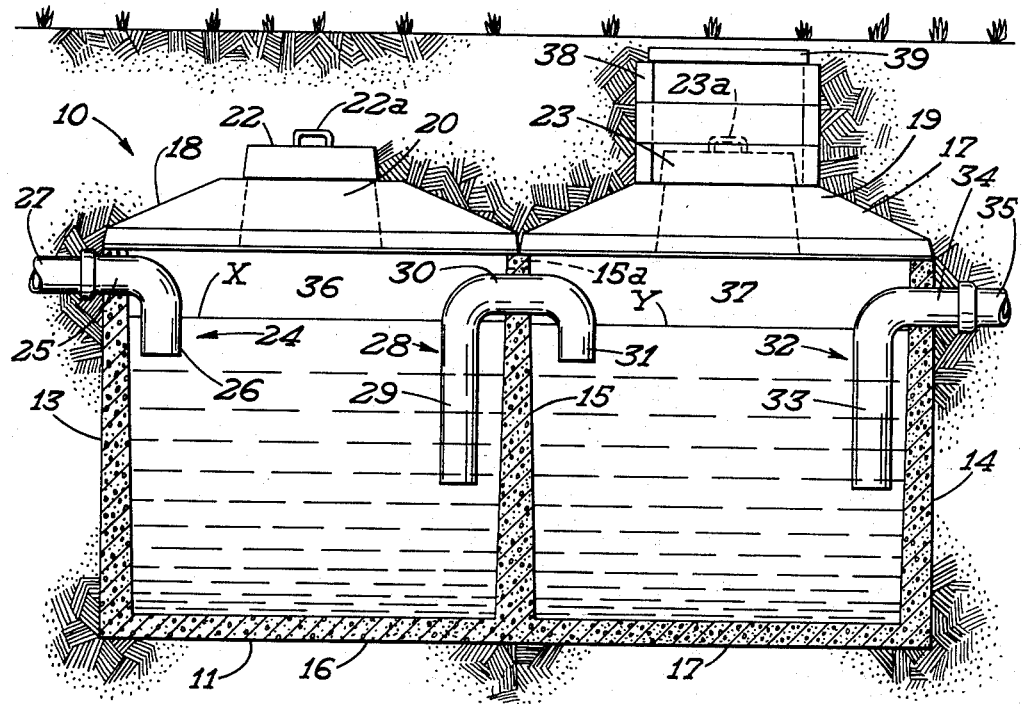
Figure 2:
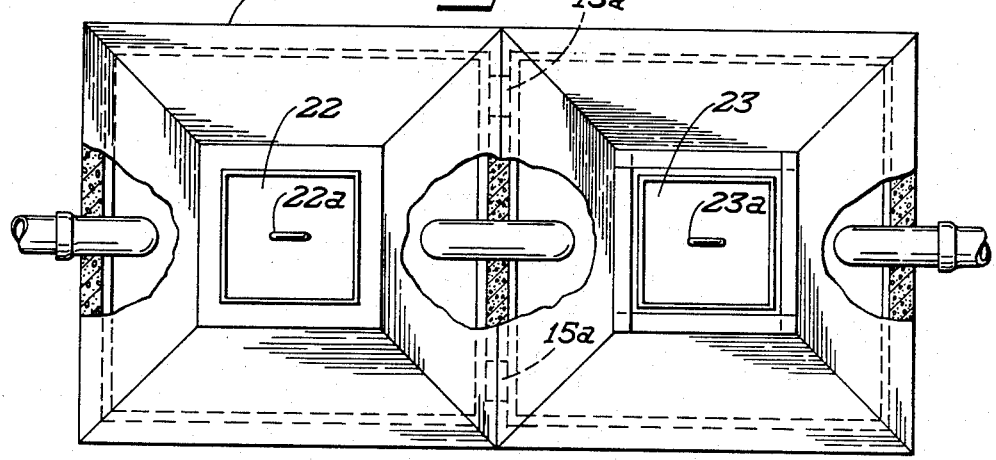

These and other objects and advantages of our invention will more fully appear from the following description made in connection with the accompanying drawings wherein like character references refer to the same or similar parts throughout the several views, and in which:

FIG. 1 is a side view of our novel septic tank construction partly in section and partly in elevation; and FIG. 2 is a top plan view of our novel septic tank with certain parts thereof broken away for clarity.

Referring now to the drawings, it will be seen that one embodiment of our novel septic tank, designated in its entirety by the reference numeral 10, is illustrated in FIG. 1 in a position of use below the surface of the ground. Septic tank 10 is of elongate substantially rectangular shape and includes a substantially flat bottom wall or base 11 having upstanding peripheral walls integrally formed therewith and including side walls 12 and end walls 13 and 14 respectively.

An intermediate or divider wall structure 15 extends transversely of the interior of the tank 10 and divides the interior thereof into a pair of side by side chambers 16 and 17 respectively. It will be noted that the interior surface of each of the side walls 12 converge slightly downwardly as best seen in FIG. 2 while the interior surface of each of the end walls 13 and 14 converge downwardly with respect to each other. Opposed surfaces of divider wall 15 also taper downwardly so that each of the compartments 16 and 17 are of trapezoidal cross-sectional shape having a larger surface area adjacent their respective upper portions.

Chamber 16 is closed in fluid-sealing relation by truncated pyramidal-shaped top 18 while chamber 17 is closed by similar truncated pyramidal-shaped top 19. Truncated top 18 is provided with a man hole opening or aperture 20 and top 19 is provided with an identically shaped opening 21. Man hole openings 20 and 21 are closed by man hole closure covers 22 and 23 respectively, as best seen in FIG. 1. Man hole cover 22 is provided with a U-shaped hand grip member 22a having its opposite end embedded within the concrete while man hole cover 23 is provided with a handle 23a attached in a similar manner. A sealing material is interplaced between the covers 22 and 23 and are sealed in their respective opening by a suitable sealing material to thereby provide a fluid seal thereat.

Septic tank 10 is of integral construction except for the pyramidal-shaped tops 18 and 19 and the tank 10 is formed by being cast from cementitious material such as concrete. Although not shown in the drawing, the casting is carried out by means of uniquely male and female mold members and the wall structures of the tank may be suitably reinforced by steel rods and the like.

A substantially L-shaped inlet conduit 24 including a horizontally extending portion 25 and an angularly offset descending outlet 26 is connected with the tank 10 in communicating relation with chamber 16. The horizontally extending portion 25 extends through the end wall portion 13 adjacent the upper portion thereof and this horizontally extending portion is also connected in fluid-conducting relation with a household sewerage disposal line 27, as best seen in FIG. 1. Water-borne sewerage will be conducted through disposal line 27 from a dwelling or other source of sewerage by means of gravity flow to the septic tank 10 and into chamber 16. Actually, the disposal line 27 will slope downwardly from the house or dwelling to the tank at a rate of from approximately ⅛ to ¼ of an inch per lineal foot.

Means are provided for permitting the liquid in chamber 16 to be conducted into chamber 17 and this means comprises an interchamber conduit 28. It will be seen that this interchamber conduit 28 includes a descending inlet portion 29, a transverse portion 30 and a descending outlet portion 31. It will be noted that the inlet portion 29 is of a substantially greater length than the descending outlet portion 31 of the interchamber conduit 28 and that the lowermost end of the inlet portion extends substantially below the water level within chamber 16.

An inverted L-shaped discharge conduit 32 is connected to the end wall 14 and includes a descending inlet portion 33 and a horizontally extending portion 34, the latter being connected in fluid-conducting relation with a drain field disposal line 35. As it is well known in the art, the disposal line 35 extends to a disposal or drain field whereby the effluent is distributed into the ground and this drain field will be at a slightly lower level than the septic tank 10. Since the water will percolate through the soil in the drain field, gravelly or sandy soil is desirable since this provides the best dispersal and purification of the water.

It will be seen that the descendant inlet portion 33 of discharge conduit 32 is of greater length than the horizontal extending portion 34 and is of a length substantially equal to the length of the descending inlet portion 29 of interchamber conduit 38. It is also pointed out that the horizontally extending portion 25 of inlet conduit 24 is disposed at a slightly higher level than the transversely extending portion 30 of interchamber conduit 28. The horizontal extending portion 34 of the discharge conduit 32 is disposed at a slightly lower level than the transverse portion 30 of the interchamber conduit 28 and these conduits cooperate with each other to define a water level within each of the chambers 16 and 17 respectively. Because of the particular disposition of the inlet, interchamber, and discharge conduit the water level within chamber 16, generally designated by X will be at a slightly higher level than the water level indicated by the reference letter Y in chamber 17.

Referring now to FIG. 1, it will be seen that the water level X in chamber 16 is spaced below the inner surface of the pyramidal-shaped top 18 while the water level Y disposed below the inner surface of pyramidal-shaped top 19 so that each chamber has an air space at the upper portion thereof. The air space within chamber 16 is designated by 36 while the air space within chamber 17 is designated by the reference numeral 37. Divider wall 15 is provided with a pair of apertures 15a so that air space 36 within chamber 16 is in communicating relation with air space 37 within chamber 17. The truncated pyramidal-shaped tops 18 and 19 for each of the chambers is disposed in sealing relation with respect to its associated chambers so that the only means of communication with the exterior of the tank 10 is through the inlet and outlet conduits 24 and 32 respectively. Both the inlet and discharge conduits are unvented and are closed with respect to the air chambers 36 and 37 so that air or gas trapped within these chambers cannot escape from the septic tank.

Access means are provided for the septic tank in the form of a man hole 38 which may be constructed of a plurality of rigid concrete blocks or the like and which is provided with a removable cover 39. This man hole preferably communicates with the man hole cover 23 which opens into chamber 17, as best seen in FIG. 1, and the man hole cover 39 will be disposed below the surface of the ground.

During the operation of my septic tank 10, a given amount of water-borne sewerage will be conducted through the sewerage disposal line 27 and through the inlet conduit 24 into chamber 16 where the solid sewerage material will be treated by the bacteria found within the liquid in this chamber. These anaerobic bacteria are responsible for the exothermic chemical decomposition of solid sewerage material so that hot sewerage gasses are generated and accumulate within air spaces 36 and 37. Since these air spaces are completely sealed from the exterior a heat exchange will take place between the hot gasses and the liquid found within chambers 16 and 17 so that the heated liquid therein is maintained in its heated condition. Maintaining the heated liquid in its heated condition within chambers 16 and 17 actually enhances the activity of the anaerobic bacteria therein so that the decomposition process is constantly taking place. All heretofore known conventional septic tank structures have vented conduits to permit the sewerage gasses to escape thus causing cooling of the spaces above the liquid. Cooling of these spaces in conventional septic tank structures results in the upper surface of the liquid becoming cooled thus slowing down the activity of the sewerage destroying bacteria so that a cake is formed on the upper surface of the liquid.

Since the amount of liquid is decreased, the bacteria are unable to cause complete decomposition of the solid sewerage material and a sludge will accumulate adjacent the bottom of the tank and eventually raw sewerage material will be caused to be disseminated through the discharge outlet into the drain field. There is much less bacterial activity in the drain field than in the septic tank and escape of raw sewerage material into the drain field actually causes the field to become clogged so that the sewerage material will back up into the tank and surface water will percolate through such a drain field contaminating underlying ground water.

However, with our uniquely constructed septic tank, the trapping of the heated gasses in the air spaces 36 and 37 precludes any depreciable change in temperature so that even in extremely cold months almost complete sewerage decomposition will take place in chamber 16. Since the spaces 36 and 37 are in communicating relation with each other, the pressure within these spaces will be the same. The irregular shaped interchamber conduit minimizes any danger of any solid material escaping into the chamber 17 whereby only the smallest sized sewerage material will escape into chamber 17 for the decomposition by the anaerobic bacteria material within. Since most of the solid sewerage will float, the unique configuration of the tapered chambers 16 and 17 with the expanded upper portions defines a much larger flotation surface so that one of this solid material is forced beneath the surface of the liquid. This further reduces any danger of the solid material escaping into chamber 17 from chamber 16. The sewerage gasses generated in chamber 17 which escape into space 37 will similarly heat the liquid in this chamber so that the bacterial decomposition action taken place therein will be enhanced. When the water-borne sewerage is first introduced into tank 16 the water level will rise slightly until the water is permitted to escape through the conduit 28 into chamber 17. This will take place since conduit 28 is disposed at a slightly lower level than inlet conduit 24. Discharge of liquid material into chamber 17 will cause the water level therein to rise until the water is caused to flow out the discharge conduit 32 and into the drain field not shown whereby final purification of the effluent will take place by percolation. In the event the sewerage gasses are generated too rapidly so that the accumulation of the same exceeds a predetermined amount in the air spaces 36 and 37, the pressure exerted thereby will cause some of the water to overflow through the discharge conduit 32 and some of the gasses will bubble through the end of the descending outlet 26 of inlet conduit 24. It will be noted, however, that only small amounts of gasses will be bled from the air spaces in the manner of a safety valve arrangement so that there is always some heated gasses in the air space to heat the liquid in the tanks. Since the bacterial decomposition action is constant and is enhanced by the heating of the liquids no solid or raw sewerage material will escape through the discharge conduit 32 and into the drain field.

It is also pointed out that the heated gases actually fill the spaces 36 and 37 so that no oxygen remains therein. This is important since the anaerobic bacteria found in the liquid in chambers 16 and 17 are more effective in the absence of oxygen, since oxygen will destroy the anaerobic bacteria. Actually, oxygen also causes the foamy material which accumulates upon the surface of the liquid to dry and form a hard rigid mat which progressively becomes thicker and which forms an insulating layer. It has been found that when such a rigid material forms on the upper surface, very little decomposition takes place and raw sewerage will be discharged through the discharge outlet. However, it will be seen that in our novel tank no oxygen can enter spaces 36 and 37 since the conduits 24 and 32 are sealed from these spaces and each extends below the water level within the compartments.

It will, therefore, be seen that we have provided a novel septic tank which is constructed and arranged to function in a more efficient manner than any heretofore known comparable device.

It will also be seen that our novel septic tank construction is of such unique construction that the interior of the tank is self heated during the decomposition or septic action process.

It will also be seen from the foregoing description that we have provided an uniquely constructed septic tank including a pair of side by side compartments arranged and constructed to minimize any chance of any raw sewerage material to escape into the drain field.

It will, of course, be understood that various changes may be made in the form, details, arrangement and proportions of the various parts without departing from the scope of our invention.

What we claim is:

A septic tank construction comprising a single, integrally formed concrete tank having a substantially flat base and having a peripherally closed upstanding wall integrally formed with said base, an upstanding divider wall structure integrally formed with said base and extending between and integrally formed with opposed portions of said wall to thereby divide the interior of said tank into a pair of chambers arranged in side-by-side relation, cover means engaging upper peripheral edges of said wall and said divider wall structure in fluid sealing relation, an inlet conduit adapted to be connected to a source of water-borne sewerage and extending through the upper portion of said wall in communication with one of said chambers for conducting water-borne sewerage into said one chamber, said inlet conduit having a substantially straight horizontal inlet portion and having a descending outlet portion extending below the normal water level within said one chamber, a discharge conduit extending through said wall adjacent the top thereof and being in communication with the other of said chambers, said discharge conduit including an ascending inlet portion and a substantially straight horizontal outlet portion, the latter being disposed slightly below the level of said horizontal inlet portion of said inlet conduit and said ascending inlet portion having its lowermost end extending below the normal water level in said other chamber, an interchamber conduit extending through said divider wall structure and including an ascending inlet portion, a horizontal intermediate portion and a depending outlet portion, said intermediate portion being disposed slightly below the horizontal inlet portion of said inlet conduit, the ascending inlet portion of said interchamber conduit being of a greater length than the depending outlet portion thereof, said last mentioned inlet and outlet portions having their respective ends disposed below the normal water level in said chambers, said ascending portion of said interchamber conduit having its lowermost end disposed at a level substantially lower than the lowermost end of the descending outlet portion of said inlet conduit, said inlet, outlet and interchamber conduits cooperating with each other for maintaining the water level within said chambers spaced below the lower surface of said cover means to thereby define a volumetric space in each chamber at the upper portion thereof, and said conduits being closed with respect to said spaces in said chambers to thereby preclude the escape of gas from the interior of said tank, said divider wall structure having a pair of spaced-apart apertures therein located above the intermediate portion of said interchamber conduit and intercommunicating said chambers to permit free circulation of sewage gases between the volumetric spaces in each of said chambers.

References Cited in the file of this patent

UNITED STATES PATENTS

| | | |
|---|---|---|
| 1,120,351 | Weston | Dec. 8, 1914 |
| 1,422,674 | Cook | July 11, 1922 |
| 1,485,623 | Mayo | Mar. 4, 1924 |
| 1,529,019 | Evans | Mar. 10, 1925 |
| 2,086,154 | Boggs | July 6, 1937 |